(12) United States Patent
Sperling et al.

(10) Patent No.: US 9,220,065 B2
(45) Date of Patent: Dec. 22, 2015

(54) ENABLING A MOBILE BROADBAND HOTSPOT BY AN AUXILIARY RADIO

(75) Inventors: David Sperling, Laguna Niguel, CA (US); Jim Mains, Newport Coast, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 193 days.

(21) Appl. No.: 13/351,184

(22) Filed: Jan. 16, 2012

(65) Prior Publication Data
US 2013/0182693 A1 Jul. 18, 2013

(51) Int. Cl.
  H04W 52/02 (2009.01)
  H04W 12/06 (2009.01)
  H04W 88/04 (2009.01)
  H04W 12/04 (2009.01)

(52) U.S. Cl.
  CPC .......... *H04W 52/0229* (2013.01); *H04W 12/06* (2013.01); *H04W 12/04* (2013.01); *H04W 88/04* (2013.01)

(58) Field of Classification Search
  None
  See application file for complete search history.

(56) References Cited

U.S. PATENT DOCUMENTS

| | | | | |
|---|---|---|---|---|
| 8,249,499 B2* | 8/2012 | Waung et al. | | 455/7 |
| 8,250,207 B2* | 8/2012 | Raleigh | | 709/224 |
| 8,959,555 B2* | 2/2015 | Monari et al. | | 725/74 |
| 2006/0072757 A1* | 4/2006 | Renkis | | 380/270 |
| 2006/0160562 A1* | 7/2006 | Davis et al. | | 455/550.1 |
| 2007/0159992 A1* | 7/2007 | Kim | | 370/311 |
| 2007/0200678 A1* | 8/2007 | Sukegawa et al. | | 340/10.32 |
| 2007/0201405 A1* | 8/2007 | Santhanam | | 370/335 |
| 2008/0254833 A1* | 10/2008 | Keevill et al. | | 455/558 |
| 2009/0047991 A1* | 2/2009 | Elg | | 455/552.1 |
| 2010/0075674 A1* | 3/2010 | Lee et al. | | 455/435.2 |
| 2010/0190470 A1* | 7/2010 | Raleigh | | 455/406 |
| 2010/0191576 A1* | 7/2010 | Raleigh | | 705/10 |
| 2010/0191847 A1* | 7/2010 | Raleigh | | 709/224 |
| 2010/0328461 A1* | 12/2010 | Renkis | | 348/143 |
| 2011/0028085 A1* | 2/2011 | Waung et al. | | 455/7 |
| 2011/0197010 A1* | 8/2011 | Rostami | | 710/315 |
| 2012/0052793 A1* | 3/2012 | Brisebois et al. | | 455/1 |
| 2012/0191895 A1* | 7/2012 | Rostami | | 710/313 |
| 2013/0281021 A1* | 10/2013 | Palin et al. | | 455/41.2 |

FOREIGN PATENT DOCUMENTS

WO  WO 2009/022201  2/2009

* cited by examiner

*Primary Examiner* — Ayaz Sheikh
*Assistant Examiner* — Faiyazkhan Ghafoerkhan
(74) *Attorney, Agent, or Firm* — Farjami & Farjami LLP

(57) ABSTRACT

There is provided a method of enabling a mobile broadband hotspot by an auxiliary radio. By utilizing a commonly available auxiliary radio, such as a Bluetooth radio, hotspot connectivity using a primary radio, such as Wi-Fi, can be readily enabled. Accordingly, device connections, guest access, and device disconnections can be easily requested on demand from a mobile broadband hotspot. Additionally, the mobile broadband hotspot may be configured to enable or disable connections using a pre-determined schedule. The pre-determined schedule may provide Internet access only when necessary, such as during scheduled device updates.

15 Claims, 5 Drawing Sheets

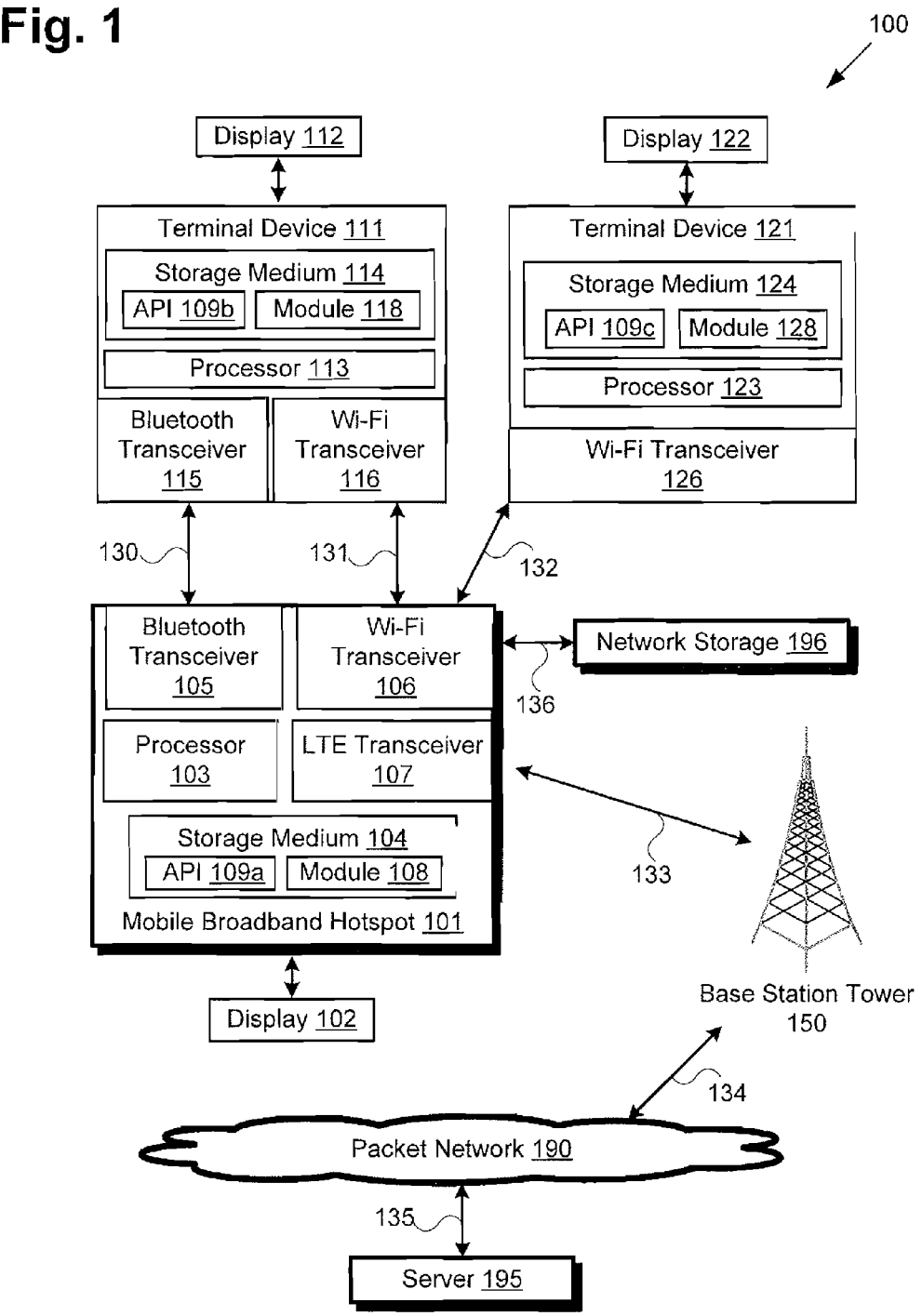

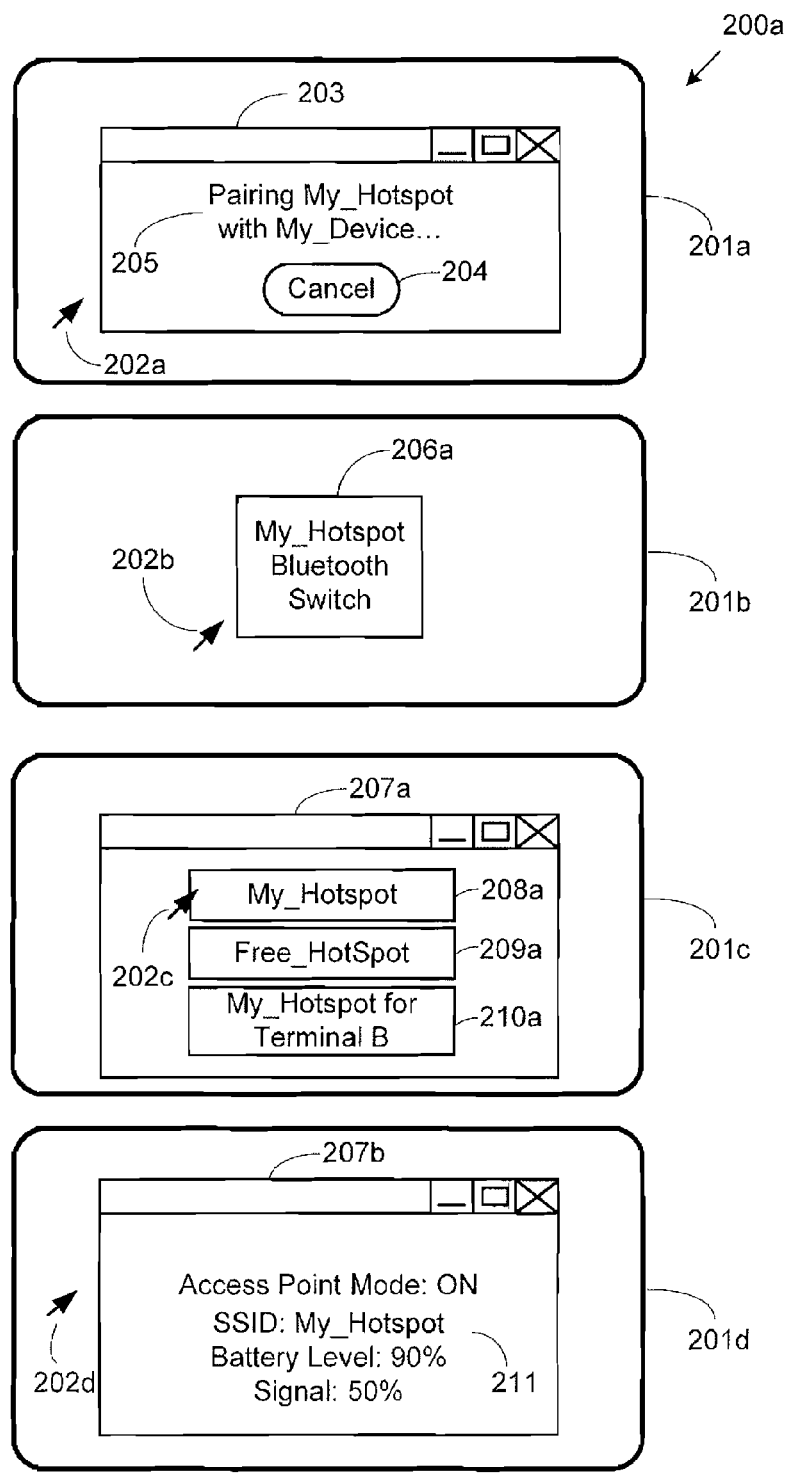

ENABLING A MOBILE BROADBAND HOTSPOT BY AN AUXILIARY RADIO

BACKGROUND

Internet connectivity enables access to social networking, personal finances, entertainment, news, shopping, and other essential goods, services, and information. With the proliferation of mobile devices such as smartphones, tablet computers, laptop computers, and other devices, there is a corresponding need to provide Internet connectivity to these mobile devices.

Currently, there is a diverse ecosystem of wireless broadband devices to provide Internet connectivity, including integrated and external mobile broadband cards, mobile hotspot devices, wireless routers, broadband modems, and others. Generally, such wireless broadband devices may provide WWAN (wireless wide area network) Internet access to other devices through a WLAN (wireless local area network) hotspot. For example, a device such as a smartphone can be configured to function as a mobile broadband hotspot by enabling an access point mode, often referred to as Wi-Fi tethering.

However, activating the access point mode of a mobile broadband hotspot often requires multiple steps. For example, to set a smartphone to access point mode, a user must typically obtain physical possession of the smartphone, navigate through a hierarchy of menu options, and set various security options and hotspot parameters prior to enabling the access point mode. Thus, it may be difficult to provide Internet access to other devices due to the numerous steps required for enabling an access point mode.

SUMMARY

The present disclosure is directed to enabling a mobile broadband hotspot by an auxiliary radio, substantially as shown in and/or described in connection with at least one of the figures, as set forth more completely in the claims.

BRIEF DESCRIPTION OF THE DRAWINGS

FIG. 1 presents an exemplary diagram of a system for setting a mobile broadband hotspot to access point mode through an auxiliary radio transceiver;

FIGS. 2a and 2b each present a set of exemplary screenshots from the display of a terminal device setting a mobile broadband hotspot to access point mode;

DETAILED DESCRIPTION

Figure 2B:
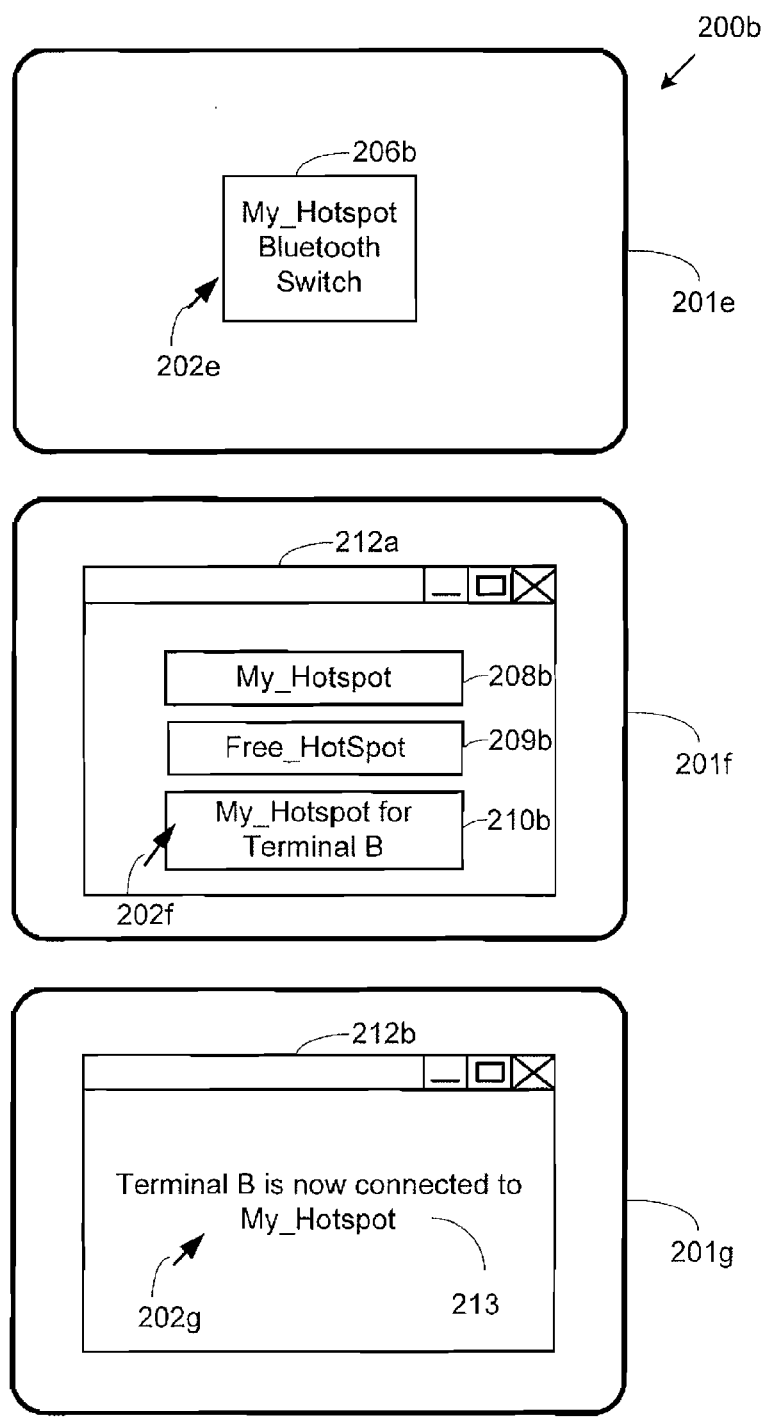

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary diagram of a system for setting a mobile broadband hotspot to access point mode through an auxiliary radio transceiver. System 100 of FIG. 1 includes mobile broadband hotspot 101, terminal devices 111 and 121, displays 102, 112, and 122, base station tower 150, packet network 190, server 195, network storage 196, and links 130, 131, 132, 133, 134, 135 and 136. Mobile broadband hotspot 101 includes processor 103, storage medium 104, Bluetooth transceiver 105, Wi-Fi transceiver 106, and 3GPP Long Term Evolution ("LTE") Transceiver 107. Storage medium 104 includes module 108 and application programming interface ("API") 109a. Terminal device 111 includes processor 113, storage medium 114, Bluetooth transceiver 115, and Wi-Fi transceiver 116. Storage medium 114 includes module 118 and API 109b. Terminal device 121 includes processor 123, storage medium 124, and Wi-Fi transceiver 126. Storage medium 124 includes module 128 and API 109c.

Mobile broadband hotspot 101 can be any type of mobile device with the ability to function as a hotspot. For example, mobile broadband hotspot 101 can be a smartphone, a personal digital assistant ("PDA"), or a tablet personal computer ("PC"). In the implementation shown in FIG. 1, mobile broadband hotspot 101 can be a smartphone with a physically integrated display 102. Each of displays 102, 112, and 122 can be a liquid crystal display ("LCD") monitor with a touch sensitive surface. Thus, displays 102, 112, and 122 may serve as input devices, as well. In other instances, other input devices may be operatively connected to mobile broadband hotspot 101 and client devices 111 and 121. In alternative implementations, mobile broadband hotspot 101 can be a dedicated hotspot device, for example, which may or may not contain a display 102. Each of terminal devices 111 and 121 can be a mobile or fixed device including a smartphone, a tablet, an in-dash device for vehicles, or an electrical or household appliance such as a television or a refrigerator, for example. Displays 112 and 122 may be optionally physically integrated with terminal devices 111 and 121, respectively.

Each of processors 103, 113, and 123 can be any type of processing hardware such as a central processing unit. Each of storage mediums 104, 114, and 124 may be any type of non-volatile data storage device, such as a flash drive with several gigabytes of storage capacity. Each of APIs 109a, 109b, and 109c is the same API. Modules 108, 118, and 128 are software applications that can be executed by processors 103, 113 and 123, respectively, in order to control the functionalities of mobile broadband hotspot 101 and terminal devices 111 and 121. Modules 108, 118, and 128 are also implemented in conformance to the API, thereby allowing mobile broadband hotspot 101 and terminal devices 111 and 121 to communicate with each other through API calls.

LTE transceiver 107 may be a radio transceiver comprising digital logic components and embedded software. LTE transceiver 107 may comprise a radio transceiver capable of wirelessly receiving and transmitting data through the LTE frequencies. Each of Bluetooth transceivers 105 and 115 may be an auxiliary radio transceiver containing digital logic components and embedded software. Bluetooth transceiver 105 may be used to transmit requests to activate or deactivate the access point of mobile broadband hotspot 101 to Bluetooth transceiver 115. Each of Wi-Fi transceivers 106, 116, and 126 may be another radio transceiver containing digital logic components and embedded software. Wi-Fi transceivers 106, 116, and 126 may be used to receive and transmit data through Wi-Fi frequencies.

Base station tower 150 may represent a cellular tower capable of wirelessly relaying data between packet network 190 and mobile broadband hotspot 101. Packet network 190 may represent a public network such as the Internet. Base station tower 150 may exchange data with LTE transceiver 107 of mobile broadband hotspot 101 at LTE frequencies and at 4G speeds through link 133. Link 134 may be a wireless or wired connection link. In other implementations, base station tower 150 may transmit data using Worldwide Interoperability for Microwave Access ("WiMAX") frequencies or 3G technologies such as UMTS, HSDPA, HSPA, HSPA+, EVDO Rev0, EVDO RevA or other frequencies. Accordingly, mobile broadband hotspot 101 may contain a WiMAX or GSM or CDMA transceiver or other transceivers.

Mobile broadband hotspot 101, using Wi-Fi transceiver 106, may transmit data obtained through LTE transceiver 107 to nearby mobile devices. However, mobile broadband hotspot 101 may only transmit data through a Wi-Fi transceiver when it is in access point mode. Terminal device 111 may therefore set mobile broadband hotspot 101 to access point mode by transmitting a request to mobile broadband hotspot 101 to activate the access point mode. The request to activate the access point mode of mobile broadband hotspot 101 may be sent through link 130, which can be a wireless Bluetooth link. The request may be transmitted at Bluetooth frequencies from Bluetooth transceiver 115. Processor 103 of mobile broadband hotspot 101 may be configured to detect, using an auxiliary radio transceiver, the request to activate the access point mode from terminal device 111. The auxiliary radio transceiver in this implementation is Bluetooth transceiver 105. In response to receiving the request to activate the access point mode from terminal device 111, processor 103 may be configured to enable the access point mode of mobile broadband hotspot 101. Once mobile broadband hotspot 101 is set to access point mode, processor 103 may be configured to establish a connection with a connecting device using another radio transceiver, such as Wi-Fi transceiver 106.

For example, the connecting device may be terminal device 111. Terminal device 111 may indicate through its Bluetooth activation request that terminal device 111 desires to connect to mobile broadband hotspot 101. However, as described later, in other implementations, the activation request may direct mobile broadband hotspot 101 to connect with another mobile device, such as terminal device 121. In other implementations, an API call may be made to mobile broadband hotspot 101 after the activation request is sent. The API call may request that mobile broadband hotspot 101 accept connections with other mobile devices.

In order to ensure a secure connection, the establishing of the connection may include performing a successful authentication between the mobile broadband hotspot and the connecting device, such as terminal device 111. The authentication may include a series of steps executed by both mobile broadband hotspot 101 and terminal device 111 to ensure that the devices are authorized to connect to each other, as known in the art. In one implementation, the client securely passes a Pre-Shared Key ("PSK") to the hotspot for security purposes, which is used to both authenticate and secure the wireless channel, for example link 131 and link 132. The authentication ensures that not just any device within the vicinity of mobile broadband hotspot 101 can connect to mobile broadband hotspot 101. Of course, in other implementations, mobile broadband hotspot 101 may also be configured to skip authentication and security with connecting devices. Once a connection is established, mobile broadband hotspot 101 and terminal device 111 may exchange data between Wi-Fi transceiver 116 and 106 through link 131, which is a wireless Wi-Fi link.

Mobile broadband hotspot 101 may recognize the request to activate the access point mode from terminal device 111 due to a prior existing pairing. If unpaired, mobile broadband hotspot 101 may not recognize or trust a request to activate the access point mode from terminal device 111. Thus, processor 103 may have been configured to perform a pairing process with terminal device 111 prior to detecting activation requests from terminal device 111. Thus, mobile broadband hotspot 101 can be configured to enable access point mode only from mobile devices that have already been previously paired.

As previously stated, the connecting device may not necessarily be the device that sends the Bluetooth request to activate the access point mode of mobile broadband hotspot. As shown in FIG. 1, terminal device 121 cannot set mobile broadband hotspot 101 to access point mode because terminal device 121 does not include an auxiliary Bluetooth transceiver. However, terminal device 111, after enabling an access point mode of mobile broadband hotspot 101, may further send an API call to mobile broadband hotspot 101 using API 109b, requesting that mobile broadband hotspot 101 connect with terminal device 121. Upon recognizing the API call, processor 103 may be configured to accept a connection with terminal device 121. Once a connection with terminal device 121 is established, mobile broadband hotspot 101 and terminal device 121 may exchange data between Wi-Fi transceivers 106 and 126 through link 132, which is a wireless Wi-Fi link. Prior to connecting with terminal device 121, mobile broadband hotspot 101 may perform an authentication with terminal device 121. In other implementations, terminal device 111 may connect to mobile broadband hotspot 101 and allow other devices to connect to mobile broadband hotspot 101. Thus, a terminal device that is already paired and configured to communicate with mobile broadband hotspot 101 may also easily direct mobile broadband hotspot 101 to provide Internet access to other guest devices.

Terminal device 111 can also easily and quickly deactivate the access point mode of mobile broadband hotspot 101. Using Bluetooth transceiver 115, terminal device 111 may send a request to deactivate the access point mode. Processor 103 of mobile broadband hotspot 101 may be configured to detect, using Bluetooth transceiver 105, the request to deactivate the access point mode from terminal device 111. Processor 103 may then be configured to disable the access point mode of mobile broadband hotspot 101 in response to receiving the request to deactivate. Processor 103 may then be further configured to terminate, using Wi-Fi transceiver 106, the connection established between the connected device, which may be terminal device 111. When terminal device 111 deactivates the access point mode of mobile broadband hotspot 101, all other devices connected to mobile broadband hotspot 101 may also be disconnected. In another implementation, the request to deactivate the access point mode may be made over the Wi-FI connection 131, which is sent from module 118 through transceiver 116, and is thus received by transceiver 106 and processed by processor 103.

Besides establishing hotspot connectivity, module 118 of terminal device 111 or module 128 of terminal device 121 may also be utilized to enable or provide information and services sourced from the owner of mobile broadband hotspot 101, a network service provider, or a third party. For example, module 118 may provide detailed information on display 112 regarding a session connection with mobile broadband hotspot 101, including bandwidth, data usage, signal strength, remaining battery, and other details.

The owner of mobile broadband hotspot 101 may also provide permissions to access services or data stores accessible from mobile broadband hotspot 101 or packet network 190. Thus, for example, terminal device 111 may be enabled to stream music or movies stored on network storage 196, or view a collection of photos hosted on server 195, which may be a third party photo sharing website. Accordingly, by simply connecting to mobile broadband hotspot 101, terminal device 111 may access various local and remote data stores and services as permitted by the owner of mobile broadband hotspot 101.

Other parties may also provide information and services through module 118 or 128. For example, a mobile data service provider may provide a means for viewing and paying individual, shared, one-time, or split data plans, or to purchase applications or other services. The owner of mobile broadband hotspot 101 may also set parameters in regards to individual device billing, for example granting free access to terminal device 111 but requiring terminal device 121 to pay for a portion of a data plan. The mobile data service provider might also provide messages, offers, and services from associated business partners. In other implementations, third party advertisers might present offers, promotions, trials, or advertisements to partially or wholly subsidize the data plan.

In some implementations, module 118 and 128 may be installed and executed as a resident application on terminal device 111 and 121, respectively. For example, module 118 and 128 may be downloaded and installed from mobile broadband hotspot 101 or server 195, which may be a server belonging to the mobile data service provider or another third party. As a result, terminal devices 111 and 121 may continuously access the data sources and services provided in the above exemplary sessions with mobile broadband hotspot 101, even if terminal devices 111 and 121 are outside the range of mobile broadband hotspot 101. Thus, the owner of mobile broadband hotspot 101 may extend data access permissions to media on network storage 196 and photos on server 195 even if terminal devices 111 and 121 are not within range of mobile broadband hotspot 101.

FIG. 2a presents a set of exemplary screenshots from the display of a terminal device setting a mobile broadband hotspot to access point mode. Diagram 200a of FIG. 2a includes screenshots 201a, 201b, 201c, and 201d. Each of screenshots 201a, 201b, 201c, and 201d is a screenshot from the same display 112 of FIG. 1. Screenshot 201a includes applet window 203, applet message 205, and cancel pairing button 204. Screenshot 201b includes digital icon 206a. Screenshot 201c includes applet window 207a, activation buttons 208a, 209a, and 210a. Screenshot 201d includes applet window 207b and applet message 211. Screenshots 201a, 201b, 201c, and 201d further include cursors 202a, 202b, 202c, and 202d, respectively.

In screenshot 201a, terminal device 111 of FIG. 1 may be attempting to pair with mobile broadband hotspot 101 of FIG. 1. Applet window 203 may be any type of applet window, including from a web browser. Applet window 203 may present applet message 205, a text message showing mobile broadband hotspot 101, named "My_Hotspot", pairing with terminal device 111, "My_Device". Pairing may be performed according to any method known in the art.

Next, screenshot 201b presents digital icon 206a, which is associated with a program stored in storage medium 114. A user may select digital icon 206a with cursor 202b to execute the program, thus activating an access point mode of mobile broadband hotspot 101. Digital icon 206a may be created by module 118 of FIG. 1 terminal device 111 successfully pairs with mobile broadband hotspot 101. While the examples shown in FIG. 2A focus on a graphical user interface where a user may select icons using a cursor, for example by a mouse or touch screen, any suitable input method or activation rule may be supported. For example, terminal device 111 may include motion sensors allowing the user to shake the device or perform gestures to initiate various functions such as activating the access point mode of mobile broadband hotspot 110. In another example, an in-dash device might automatically activate the access point mode of mobile broadband hotspot 110 if a GPS of the in-dash device detects proximity to the driver's garage, thereby automatically turning on the hotspot when the user returns home.

As shown in screenshot 201c, applet window 207a is presented after the user selects digital icon 206a. Activation button 208a may then be selected with cursor 202c to direct terminal device 111 to send an access point mode activation request to mobile broadband hotpot 101. Additionally, to provide guest access, activation button 210a may be selected to direct mobile broadband hotspot 101 to accept connections from terminal device 121, or "Terminal B". Alternatively, activation button 209a may be selected to direct terminal device 111 to connect to a different hotspot that is not mobile broadband hotspot 101. In another implementation, when the user selects digital icon 206a with cursor 202b, the steps performed by 208a could be done automatically thus resulting in a one click operation for the user to gain internet access from terminal device 111. In yet another implementation, an application such a web browser running on device 111 may trigger the activation of the mobile hotspot if it detects that the device does not have Internet connectivity when the user tries to connect to an Internet web-site.

As shown in screenshot 201d, applet window 207a may transition to applet window 207b after the user selects activation button 208a with cursor 202d. Applet message 211 indicates that mobile broadband hotspot 101 is set to access point mode. Applet message 211 may contain additional information including a service set identifier ("SSID"), a signal strength level indicator which shows WWAN signal strength of base station 150 and link 133, and a battery power level of mobile broadband hotspot 101. Processor 103 of FIG. 1 may also be configured to display applet message 211 on display 102. In other implementations, applet window 207a may also contain additional indicators about the WWAN connection such as 2G/3G/4G coverage indication, a roaming network indicator, and other information about transceiver 107, base station 150 and packet network 190.

FIG. 2b presents another set of exemplary screenshots from the display of a terminal device setting a mobile broadband hotspot to access point mode. Diagram 200b of FIG. 2b includes screenshots 201e, 201f, and 201g. Each of screenshots 201e, 201f, and 201g may be a screenshot of the same display 112 of FIG. 1. Screenshot 201e includes digital icon 206b. Screenshot 201f includes applet window 212a and activation buttons 208b, 209b, and 210b, which correspond to 208a, 209a, and 210a, respectively. Screenshot 201g includes applet window 212b and applet message 213. Screenshots 201e, 201f, and 201g further include cursors 202e, 202f, and 202g, respectively.

In screenshot 201e, digital icon 206b is again displayed on display 112 of FIG. 1. As described earlier, digital icon 206b may be used to send an activation request to mobile broadband hotspot 101 of FIG. 1 to set it to an access point mode. The user may thus select digital icon 206b to send the activation request.

In screenshot 201f, applet window 212a appears after user selects digital icon 206b in screenshot 201e. Once again, activation buttons 208b, 209b, and 210b are shown in applet window 212*a*, and may also provide similar functionality as activation buttons 208*a*, 209*a*, and 210*a* from FIG. 2*a*. The user may select activation button 210*b* to set mobile broadband hotspot 101 to an access point mode for connecting a guest device. Activation button 210*b* may be configured so that the connecting device can be terminal device 121, "Terminal B".

In screenshot 201*g*, applet window 212*b* displays applet message 213. Applet message 213 may appear shortly after the user selects activation button 210*b*. Applet message 213 presents a message stating that terminal device 121 is now connected to mobile broadband hotspot 101.

Figure 2C:
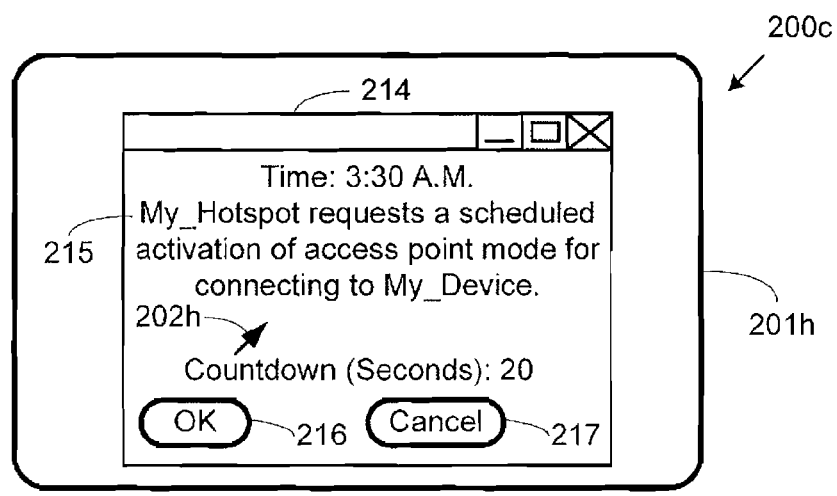
FIG. 2c presents exemplary screenshots from the display of a terminal device during a scheduled setting of a mobile broadband hotspot to access point mode.

FIG. 2*c* presents exemplary screenshots from the display of a terminal device during a scheduled setting of a mobile broadband hotspot to access point mode. Diagram 200*c* of FIG. 2*c* includes screenshot 201*h*. Screenshots 201*h* may be a screenshot of the same display 112 of FIG. 1. Screenshot 201*h* includes applet window 214, applet message 215, accept button 216, and cancel button 217. Screenshot 201*h* further includes cursor 202*h*.

In screenshot 201*h*, mobile broadband hotspot 101 may induce terminal device 111 to send an activation request to activate mobile broadband hotspot 101. Applet window 214 may be any type of applet window, including from a web browser. Applet window 214 may contain applet message 215, presenting a message associated with a scheduled connection request sent from mobile broadband hotspot 101 to terminal device 111. The scheduled connection request causes terminal device 111 to transmit an access point mode activation request back to mobile broadband hotspot, using the same process as already described above.

The scheduled connection request can be sent at a predetermined time to one or more paired devices. In this instance, the activation notification is sent to terminal device 111 at 3:30 A.M. This functionality allows terminal device 111 to connect to mobile broadband hotspot 101 without any user presence, for example to provide Internet connectivity for scheduled software updates. Applet message 215 indicates that terminal device 111 will automatically send a request to set mobile broadband hotspot 101 to access point mode within 20 seconds. If the user is present, the user may select accept button 216 with cursor 202*h* to immediately send the activation request, or the user may select cancel button 217 to cancel the scheduled activation request. Similarly, scheduled disconnection requests may also be sent at a predetermined time. In this manner, power consumption and battery life of all the devices may be extended by enabling mobile broadband hotspot 101 only as needed.

Figure 3:
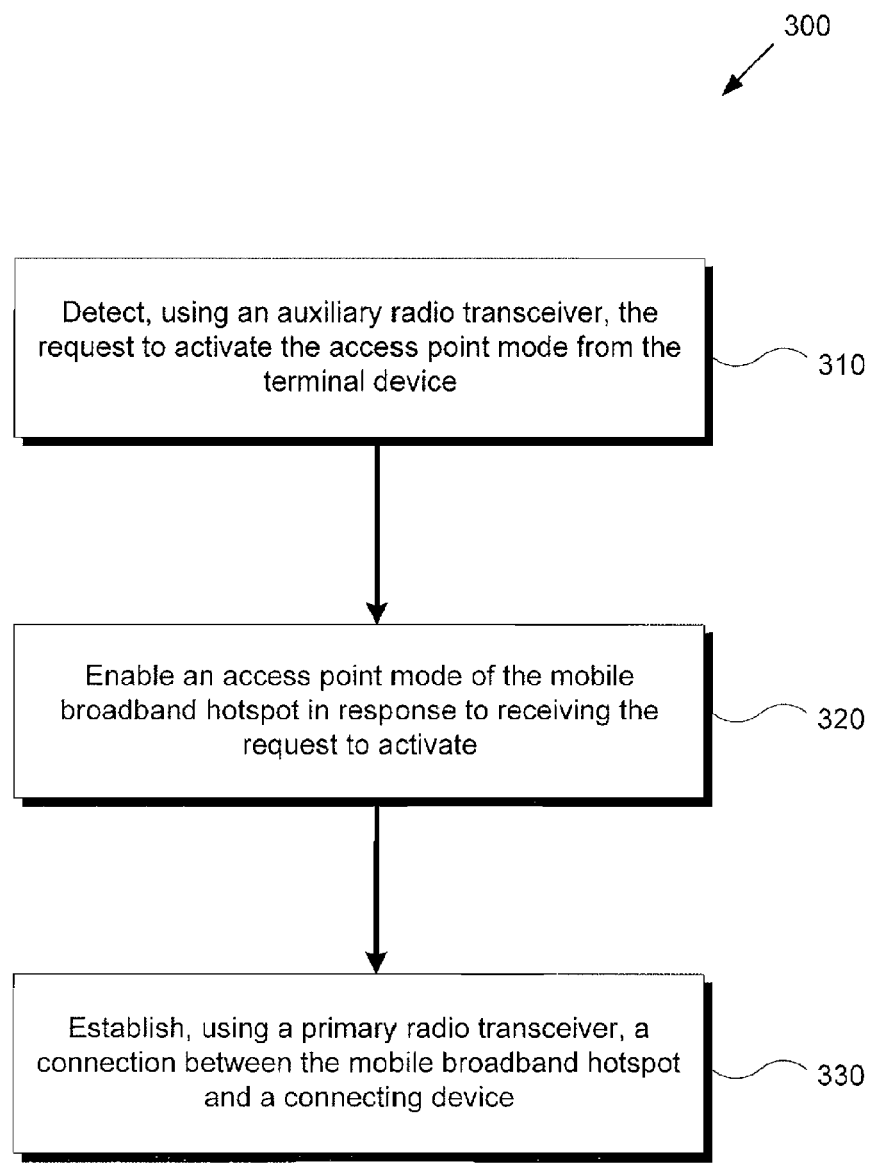
FIG. 3 presents an exemplary flowchart illustrating a method of setting a mobile broadband hotspot to access point mode through an auxiliary radio transceiver.

FIG. 3 presents an exemplary flowchart illustrating a method of setting a mobile broadband hotspot to access point mode through an auxiliary radio transceiver. Certain details and features have been left out of flowchart 300 that are apparent to a person of ordinary skill in the art. While the method indicated in flowchart 300 is sufficient to describe one implementation of the present application, other implementations may utilize a different method.

Referring to flowchart 300 in FIG. 3 and system 100 of FIG. 1, flowchart 300 begins when processor 103 detects, using an auxiliary radio receiver, such as Bluetooth transceiver 105, a request to activate the access point mode from a connecting device, such as terminal device 111 (310). As previously described, a user my cause terminal device 111 to send the request to activate the access point mode. In other situations, terminal device 111 may receive a scheduled connection request to activate or deactivate mobile broadband hotspot 101, as described in FIG. 2*c*.

Next, referring to flowchart 300 in FIG. 3 and system 100 of FIG. 1, flowchart 300 proceeds as processor 103 enables the access point mode of mobile broadband hotspot 101 in response to receiving the request to activate (320). Once the activation request is received by Bluetooth transceiver 105, mobile broadband hotspot 101 will enable its access point mode. As previously described, mobile broadband hotspot 101 may recognize and accept the activation request from terminal device 111 due to prior pairing between the two devices.

Finally, referring to flowchart 300 in FIG. 3 and system 100 of FIG. 1, flowchart 300 proceeds as processor 103 establishes, using a primary radio transceiver such as Wi-Fi transceiver 106, a connection between mobile broadband hotspot 101 and a connecting device (330). As previously discussed, a pre-shared key (PSK) may be utilized to secure the connection. Mobile broadband hotspot 101 may establish a connection with the device that is sending the activation request, in which case the connecting device is terminal device 111. However, in other implementations, terminal device 111 may also direct mobile broadband hotspot 101 to allow connection from another terminal device, such as terminal device 121, thereby providing guest access.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementation described herein, but many rearrangements, modifications, and substitutions are possible without departing from the present disclosure.

What is claimed is:

1. A mobile broadband hotspot having an access point mode, the mobile broadband hotspot comprising:
   a primary radio transceiver;
   an auxiliary radio transceiver; and
   a processor configured to:
      detect, using the auxiliary radio transceiver, a request to activate the access point mode of the mobile broadband hotspot, from a first connecting device of a plurality of connecting devices;
      enable the access point mode of the mobile broadband hotspot for establishing connections with two or more of the plurality of connecting devices using the primary radio transceiver, in response to receiving the request to activate; and
      establish, using the primary radio transceiver and after enabling the access point mode, a first connection with the first connecting device and a second connection with a second connecting device of the plurality of connecting devices;
      wherein the request includes directing the mobile broadband hotspot to establish the second connection with the second connecting device of the plurality of connecting devices.

2. The mobile broadband hotspot of claim 1, wherein the auxiliary radio transceiver comprises a Bluetooth transceiver.

3. The mobile broadband hotspot of claim 1, wherein the primary radio transceiver comprises a Wi-Fi transceiver.

4. The mobile broadband hotspot of claim 1, wherein the processor is further configured to:

detect, using the auxiliary radio transceiver, a second request from the first connecting device to deactivate the access point mode;

disable the access point mode of the mobile broadband hotspot in response to receiving the second request to deactivate; and terminate, using the primary radio transceiver, the first connection and the second connection with the mobile broadband hotspot.

5. The mobile broadband hotspot of claim 1, wherein prior to detecting, the processor is configured to transmit a scheduled connection request to the first connecting device, wherein the scheduled connection request causes the first connecting device to transmit the request to activate the access point mode.

6. The mobile broadband hotspot of claim 1, wherein the establishing the second connection comprises performing a successful authentication between the mobile broadband hotpot and the second connecting device.

7. The mobile broadband hotspot of claim 1, wherein the detecting further comprises the receiving of a Pre-Shared Key in the request, and wherein each of the first connection and the second connection uses the Pre-Shared Key for security purposes.

8. A system for activating an access point mode of a mobile broadband hotspot through an auxiliary radio transceiver, the system comprising:

a terminal device comprising a terminal radio transceiver, wherein the terminal radio transceiver is configured to transmit a request to activate the access point mode; and a mobile broadband hotspot comprising a primary radio transceiver, the auxiliary radio transceiver and a processor, wherein the processor is configured to:

detect, using the auxiliary radio transceiver, the request to activate the access point mode of the mobile broadband hotspot, from a first connecting device of a plurality of connecting devices;

enable the access point mode of the mobile broadband hotspot for establishing connections with two or more of the plurality of connecting devices using the primary radio transceiver, in response to receiving the request to activate; and establish, using the primary radio transceiver and after enabling the access point mode, a first connection with the first connecting device and a second connection with a second connecting device of the plurality of connecting devices;

wherein the request includes directing the mobile broadband hotspot to establish the second connection with the second connecting device of the plurality of connecting devices.

9. The system of claim 8, wherein prior to detecting, the processor is configured to transmit a scheduled connection request to the first connecting device, wherein the scheduled connection request causes the first connecting device to transmit the request to activate the access point mode.

10. The system of claim 8, wherein the processor is configured to detect a Pre-Shared Key in the request, and wherein the processor is configured to establish each of the first connection and the second connection using the Pre-Shared Key for security purposes.

11. A method for activating an access point mode of a mobile broadband hotspot having a primary radio transceiver and an auxiliary radio transceiver, the method comprising:

detecting, using the auxiliary radio transceiver, a request to activate the access point mode of the mobile broadband hotspot, from a first connecting device of a plurality of connecting devices;

enabling the access point mode of the mobile broadband hotspot for establishing connections with two or more of the plurality of connecting devices using the primary radio transceiver, in response to receiving the request to activate; and establishing, using the primary radio transceiver and after enabling the access point mode, a first connection with the first connecting device and a second connection with a second connecting device of the plurality of connecting devices;

wherein the request includes directing the mobile broadband hotspot to establish the second connection with the second connecting device of the plurality of connecting devices.

12. The method of claim 11, wherein the primary radio transceiver comprises a Wi-Fi transceiver, and wherein the auxiliary radio transceiver comprises a Bluetooth transceiver.

13. The method of claim 11 further comprising:

detecting, using the auxiliary radio transceiver, a second request from the first connecting device to deactivate the access point mode;

disabling the access point mode of the mobile broadband hotspot in response to receiving the second request to deactivate; and terminating, using the primary radio transceiver, the first connection and the second connection with the mobile broadband hotspot.

14. The method of claim 11 further comprising, prior to the detecting, transmitting a scheduled connection request to the first connecting device, wherein the scheduled connection request causes the first connecting device to transmit the request to activate the access point mode.

15. The method of claim 11, wherein the detecting further comprises receiving a Pre-Shared Key in the request, and wherein the establishing of each of the first connection and the second connection uses the Pre-Shared Key for security.

* * * * *